March 22, 1955     T. W. LILLY     2,704,389
SKEWER CLIP
Filed July 14, 1952
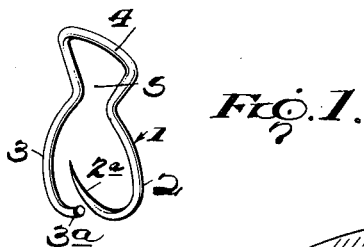
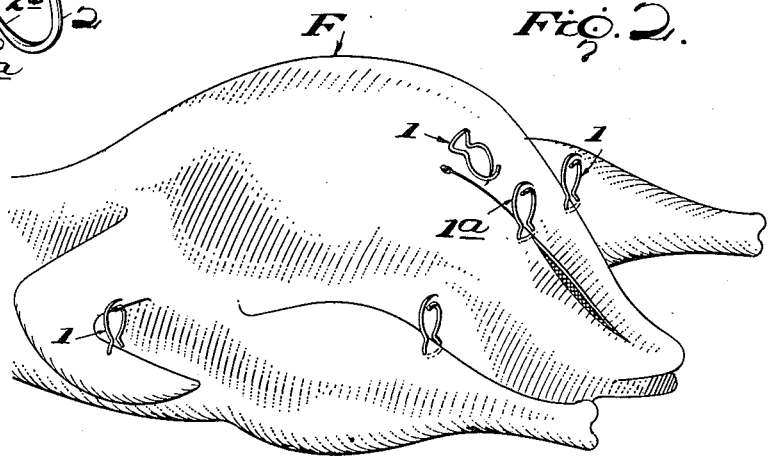
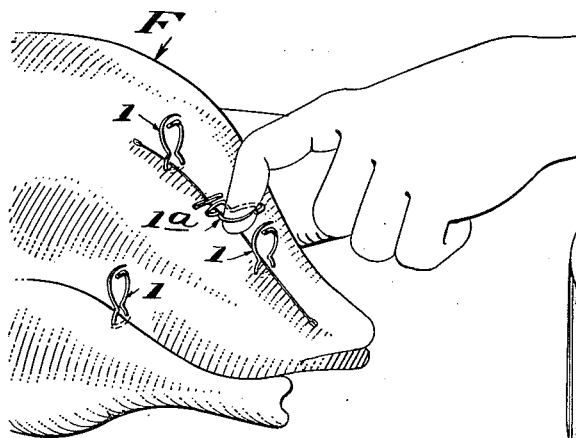
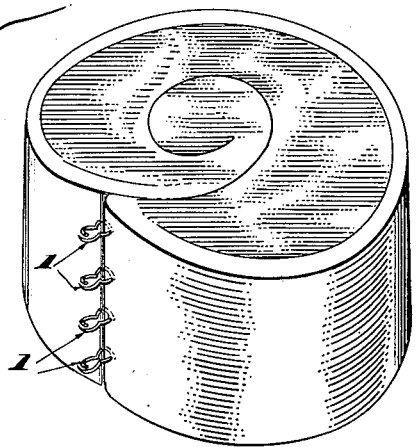
INVENTOR
*Thornton W. Lilly,*
BY
ATTORNEY – # United States Patent Office 2,704,389
Patented Mar. 22, 1955

2,704,389

SKEWER CLIP

Thornton W. Lilly, Phillipsburg, N. J.

Application July 14, 1952, Serial No. 298,817

1 Claim. (Cl. 24—150)

This invention relates to skewers intended for closing the seams in meat during cooking, the term "meat" being used herein in a broad sense to include fish and fowl as well as meat rolls.

An important object of my invention is to provide a skewer in the form of a clip that may be employed as a substitute for the strings that are commonly used for lacing the seams of meats and which may be readily inserted into and removed from the flesh with a minimum amount of time and trouble.

Another object of my invention is to provide a skewer clip of the above character which is so constructed and arranged as to lock into the flesh and tightly maintain the seam closed while the meat is being cooked.

A further object of my invention is to provide a skewer clip of the above character that is adapted to be easily disengaged from the cooked meat by the housewife simply by exerting a straight tug or pull upon the clip and without the necessity for touching the meat.

Still another object of my invention is to provide a skewer clip of the above character that lends itself to economical manufacture, that may be repeatedly used and that can be easily cleaned and kept in a sanitary condition.

Other objects and advantages will be apparent from the following detailed description of a preferred embodiment of the invention, reference being had to the accompanying drawing in which:

Figure 1 is a perspective view of a skewer clip;

Figure 2 is a view showing the manner in which the clips are used for closing the seam in a fowl, and for binding the legs and wings;

Figure 3 is a view showing the manner in which the clip is removed from the fowl; and Figure 4 is a view showing how the clips are used for binding a roll of meat.

In Fig. 1 is shown a skewer clip 1 made from a strand of spring-metal wire bent into the form of a more or less circular loop. The size of the loop is preferably such that the forefinger may be inserted therein for a purpose later to be described. The loop comprises two arcuate half sections 2 and 3 laterally sprung apart or out of a common plane so that their ends 2a and 3a present a small gap therebetween. The arcuate half section 2 which is adapted to function in the manner of a bent needle is provided upon its end 2a with a point, while the end 3a of the other half section is bent so as to overhang the pointed end 2a and serve as a guard to prevent the finger from coming into contact with the point.

At a position diametrically opposite the gap between the ends 2a and 3a the loop 1 is bent outwardly to form a smaller loop or bight 4. The half sections of the bight are convergently related in the locality of their junction with the loop 1 so as to define a narrow passage 5 connecting the area encompassed by the loop with the area encompassed by the bight. The clip may thus be regarded as generally resembling a figure 8.

In using the form of skewer clip just described to close the seam 6 of a fowl F as shown in Fig. 2, the pointed half section 2 of the loop is forced with a needle-like action into the flesh of the fowl upon one side of the seam and because of its arcuate form, it eventually emerges from the flesh upon the opposite side of the seam. The half section 2 of the loop as it penetrates the flesh serves as a gatherer and after the loop has traversed a distance such as to bring the bight 4 astride the seam the gathered flesh slips into the bight where it becomes securely locked drawing the two sides of the seam tightly together. The clip 1a in Fig. 2 shows the clip in fully inserted position.

After the fowl has been baked or roasted it is only necessary for the housewife to insert her finger into the projecting loop 1 and by exerting an outward tug the meat overlying the bight portion 4 is ruptured and the clip pulls free. The break in the flesh as a result of extracting the clip is hardly noticeable and does not impair the appearance of the meat. At the same time, the removal of the clip is accomplished speedily and tidily without requiring the housewife to bring her hands into contact with the fowl.

While I have illustrated and described the use of my skewer clip for closing the seam of a fowl, the clip is susceptible of various other useful applications. For example, the clips may be used for holding the legs and wings in place during cooking, as shown in Fig. 1. Also, the clip may be employed for closing the incisions in fish after they have been cleaned. In Fig. 4 is illustrated a roast of meat 6 having clips 1 inserted through the overlying folds of the cut for holding the meat roll together.

The clip may be made of stainless steel or any other non-corrosive metal or of plastic material to avoid the danger of corrosion by the acids and juices of the meats. The clip may be used over and over again and may be maintained in a clean and sanitary condition simply by keeping it immersed in a glass of water when not in use.

The loop of the clip manifestly may take other forms than that shown and described so long as the half section 2 is of generally arcuate shape and is capable of being forced through the flesh of a fowl in a needle-like fashion. The half section 3 may be of almost any shape since it does not enter the flesh. Or both the sections 2 and 3 may be arcuately formed and provided with pointed ends; but ordinarily this will be unnecessary since, by simply reversing the clip, the arcuate, pointed end of the loop may be disposed on either side of the seam. The bight 4 serves the important purpose of locking the seam tightly closed.

While I have illustrated and described a preferred embodiment of the skewer clip of my invention it is to be understood that various changes in construction and design may be made therein without departing from the spirit of my invention as set forth in the following claim.

I claim:

A skewer clip for closing the seams of meat and for locking the seams together during cooking, said skewer comprising a single, unitary wire shaped approximately in the form of a figure 8 defining two counterpart half-sections symmetrical with respect to a longitudinal axis extending centrally throughout the clip, said half-sections having their midportions projecting toward but affording a narrow passage therebetween, whereby the half-sections together define a substantially closed loop section and a bight section integral with and offset from the loop section and of smaller encompassed area than the loop section, the portions of the wire forming the sides of the loop section being smoothly and arcuately curved and terminating in curved free ends lying in close proximity and laterally overlapping at the bottom of the clip to serve as a finger grip for the removal of the clip from the meat by a longitudinal pull, and one of the free ends of the wire being provided with a penetrating point, whereby the arcuate portion of wire provided with the penetrating point may be forced with a needle-like action into the meat so as to cause the clip to follow a curved path to come to rest astride the seam with a gathering of the meat upon opposite sides of the seam locked within the bight section of the clip.

References Cited in the file of this patent

UNITED STATES PATENTS

| Number | Name | Date |
|---|---|---|
| 600,815 | Wadsworth | Mar. 15, 1898 |
| 766,408 | Wooley | Aug. 2, 1904 |
| 1,291,143 | Reinhardt-Rutland | Jan. 14, 1919 |
| 1,655,994 | Frost | Jan. 10, 1928 |
| 2,521,927 | Magidson | Sept. 12, 1950 |

FOREIGN PATENTS

| 483,488 | Great Britain | Apr. 20, 1938 |